G. G. HUNT.
BARBED-FENCE.

No. 193,370. Patented July 24, 1877

Attest.
David Ferriss
Theodore S Hunt

Inventor.
George G. Hunt

UNITED STATES PATENT OFFICE.

GEORGE G. HUNT, OF BRISTOL, ILLINOIS.

IMPROVEMENT IN BARBED FENCES.

Specification forming part of Letters Patent No. 193,370, dated July 24, 1877; application filed June 21, 1877.

*To all whom it may concern:*

Be it known that I, GEORGE G. HUNT, of Bristol, Illinois, have invented an additional Improvement in Barbed Fence, (for which barbed fence Letters Patent from the United States were granted to me on the 24th day of April, 1877,) and of which additional improvement the following is a description, reference being had to the drawings accompanying and forming a part of this specification, in which—

Figure 1:
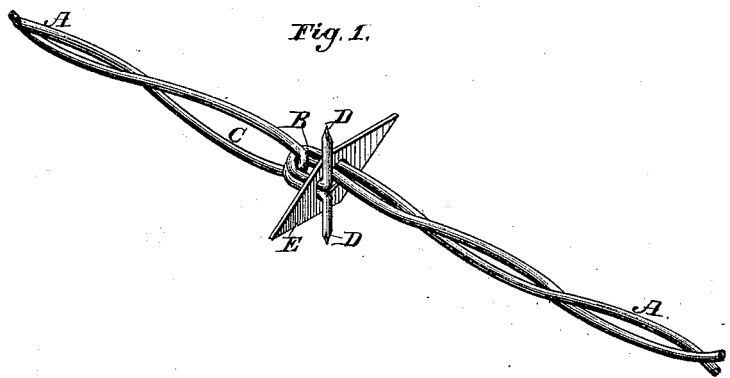
Figure 2:

Figure 1 is a perspective view of the invention; and Fig. 2 is a view of a steel barb cut from hard-rolled strips of cast-steel, by preference.

In my patent of April 24, 1877, the sections A A of the wires were simply hooked together by the hook B and eye C, Fig. 1, and presenting only the spurs or barbs D D.

My additional improvement consists in placing a barb, E, upon the hook B, in such a manner as to effectually prevent the hook from spreading when undue strain is put upon the wire, and also to present additional spurs or points in a different direction from that in which the spurs D D point. Thus, the spurs D D may point upward and downward, and the points of barb E may point horizontally across the wire.

The barb E is put on the wire in its proper position, as shown in Fig. 1, before the points or spurs D D are bent laterally outward, and in the operation of spreading and bending the spurs D D outward the barb E is crowded toward the bight of the hook, and held firmly in position. A piece of wire with pointed ends to form spurs may, if desired, be used instead of the barb E.

The barb E is provided with a hole, $f$, which is of a size to fit snugly on the hook B.

Having thus described my invention, what I claim as new, and desire to secure by Letters Patent, is—

The barb E, in combination with short sections of wire A, provided with a hook, B, at one end, and an eye or loop, C, at the other end, when such barb is used substantially in the manner and for the purposes hereinbefore specified.

GEORGE G. HUNT.

Witnesses:
T. S. HUNT,
WM. H. KING.